US008901760B2

(12) United States Patent
Wai et al.

(10) Patent No.: US 8,901,760 B2
(45) Date of Patent: Dec. 2, 2014

(54) DUAL GENERATOR SINGLE DC LINK CONFIGURATION FOR ELECTRIC DRIVE PROPULSION SYSTEM

(71) Applicant: Caterpillar Inc., Peoria, IL (US)

(72) Inventors: Jackson Wai, Dunlap, IL (US); Robert R. Sychra, Washington, IL (US); Robert W. Lindsey, Washington, IL (US); Thomas M. Sopko, East Peoria, IL (US); Bruce H. Hein, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/752,012

(22) Filed: Jan. 28, 2013

(65) Prior Publication Data

US 2014/0210208 A1    Jul. 31, 2014

(51) Int. Cl.
*H02P 9/00* (2006.01)
*B60L 11/08* (2006.01)

(52) U.S. Cl.
CPC ..................... *B60L 11/08* (2013.01)
USPC .......................................................... 290/7

(58) Field of Classification Search
CPC ........................................................ B60K 6/46
USPC ........................................................ 290/45
See application file for complete search history.

(56) References Cited

U.S. PATENT DOCUMENTS

| 4,692,671 | A * | 9/1987 | Dishner et al. ............. 318/11 |
| 6,075,717 | A * | 6/2000 | Kumar et al. .............. 363/87 |
| 6,691,806 | B2 * | 2/2004 | Wolfgang et al. .............. 180/6.7 |
| 7,152,705 | B2 | 12/2006 | Alster et al. |
| 7,518,254 | B2 * | 4/2009 | Donnelly et al. ........... 290/40 C |
| 7,543,665 | B2 | 6/2009 | Zwilling et al. |
| 7,825,530 | B2 * | 11/2010 | Schulte et al. .............. 290/40 B |
| 7,956,584 | B2 * | 6/2011 | Peterson et al. ................ 322/44 |
| 8,220,572 | B2 * | 7/2012 | Donnelly ................. 180/65.265 |
| 8,525,492 | B2 * | 9/2013 | Peterson et al. ................ 322/44 |
| 8,772,954 | B1 * | 7/2014 | Barngrover ........................ 290/7 |
| 2005/0012339 | A1 * | 1/2005 | Mikhail et al. ................... 290/44 |
| 2009/0233759 | A1 * | 9/2009 | Sheidler et al. .................... 477/3 |
| 2011/0048827 | A1 | 3/2011 | Cherney et al. |
| 2012/0161452 | A1 * | 6/2012 | Wai et al. ......................... 290/40 |
| 2012/0169114 | A1 * | 7/2012 | Andris ........................... 307/9.1 |

FOREIGN PATENT DOCUMENTS

| WO | WO 2008130968 A1 * | 10/2008 |
| WO | WO 2011041425 A2 * | 4/2011 |

* cited by examiner

*Primary Examiner* — Joseph Waks
(74) *Attorney, Agent, or Firm* — Leydig, Voit & Mayer, Ltd.

(57) ABSTRACT

A machine is described that includes an electric drive for propelling the machine along a ground surface. The machine includes an electric power supply system configured to deliver operating electrical power to the electric drive. The electric power system includes a first generator and a second generator. The electric power system also includes a first rectifier coupled to the first generator and having a first direct current (DC) output and a second rectifier coupled to the second generator and having a second DC output. Both the first DC output and the second DC output are coupled to the single DC bus, thereby providing an arrangement for the first rectifier and the second rectifier to simultaneously provide power to the single DC bus. The electrical power system also includes a first inverter/controller coupled to the single DC bus and configured to provide a controlled alternating current to a first motor.

19 Claims, 4 Drawing Sheets

DUAL GENERATOR SINGLE DC LINK CONFIGURATION FOR ELECTRIC DRIVE PROPULSION SYSTEM

TECHNICAL FIELD

This patent disclosure relates generally to electrical systems and components within a machine and, more particularly to an electric drive system for a work machine.

BACKGROUND

Direct series electric drive systems for machines typically include a power circuit that selectively activates one or more drive motors at a desired torque. Each of the drive motors is connected to a wheel or other traction device that operates to propel the machine. A direct series drive system also includes a prime mover, for example, an internal combustion engine, that drives a power generator. The power generator produces electrical power that is often conditioned by a power circuit, and ultimately used to drive the motor. Conceptually, as the machine is propelled, mechanical power produced by the engine is converted into electrical power by the generator. This electrical power may be processed and/or conditioned by the power circuit before it is metered to the motors. The motors transform the electrical power back into mechanical power that drives the wheel and propels the machine.

Heavy machinery, such as off-highway truck and wheel loader equipment, is commonly used in mining, heavy construction, quarrying, and other applications. The adoption of electric drive systems has been viewed as improving efficiency and reliability of such machinery. Electric drive systems generally require less maintenance and thus, have lower life cycle costs.

Earlier generations of power systems for driving multiple electric motors relied upon a single generator to supply power to a single power bus. Multiple motors, in turn, are powered via the single power bus. More recently power systems have been proposed wherein multiple generators supply power for powering the multiple motors. Alster et al., U.S. Pat. No. 7,152,705 proposes an electric drive arrangement where generators, driven individually by dual engines, charge a single power storage module. The power bus for a set of electric drive motors, in turn, is powered directly by the power storage module.

Another example of a multiple generator system for driving multiple electric motors divides power supply into a distinct power bus for each generator. In the described embodiment, a first generator provides power to a first power bus connected to a first set of two motors. A second generator provides power to a second power bus connected to a second set of two motors.

Dual generator power systems offer advantages over earlier, single generator power systems. For example, smaller generators can be used that are potentially less expensive than a single generator providing twice the power. Moreover, a variety of partial failure modes are potentially supported in the event that one of the power sources fails.

SUMMARY

The disclosure describes, in one aspect, an electric power supply system configured to deliver operating electrical power in a machine having an electric drive system. The electric power supply system includes a first generator and a second generator, each configured to receive an output provided by a prime mover. The system further includes a first rectifier coupled to the first generator and having a first direct current (DC) output, and a second rectifier coupled to the second generator and having a second DC output. Both the first DC output and the second DC output are coupled to a same single DC bus, thereby providing an arrangement for the first rectifier and the second rectifier to simultaneously provide power to the single DC bus. The electric power supply system also includes a first inverter/controller coupled to the single DC bus and configured to provide a controlled alternating current to a first motor driving a final drive of the machine.

The disclosure further describes both a method for operating the electric power supply system and a machine (e.g. a wheel loader) incorporating the electric power supply system.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

This disclosure relates to systems and methods for providing electrical power to electrical components in an electric drive machine or vehicle. The disclosure that follows uses an example of a direct series electric drive system having an engine connected to two generators for producing electrical power delivered via a single power bus that delivers electrical power for consumption by electrical power components, such as electric drive motors of a vehicle. In the exemplary embodiments presented, the generators associated with the machine are multi-phase alternating current (AC) synchronous brushless generators having a rotating input coupled with the output of the engine (prime mover). The generators include a rotating rectifier assembly including three rotating diode pairs, and the generators use a wye (Y) configuration for their windings. The systems and control method described herein, however, also have applicability to other electric drive vehicles. For example, the generators associated with the machine or vehicle could use a delta (Δ) configuration for the windings.

Figure 1:
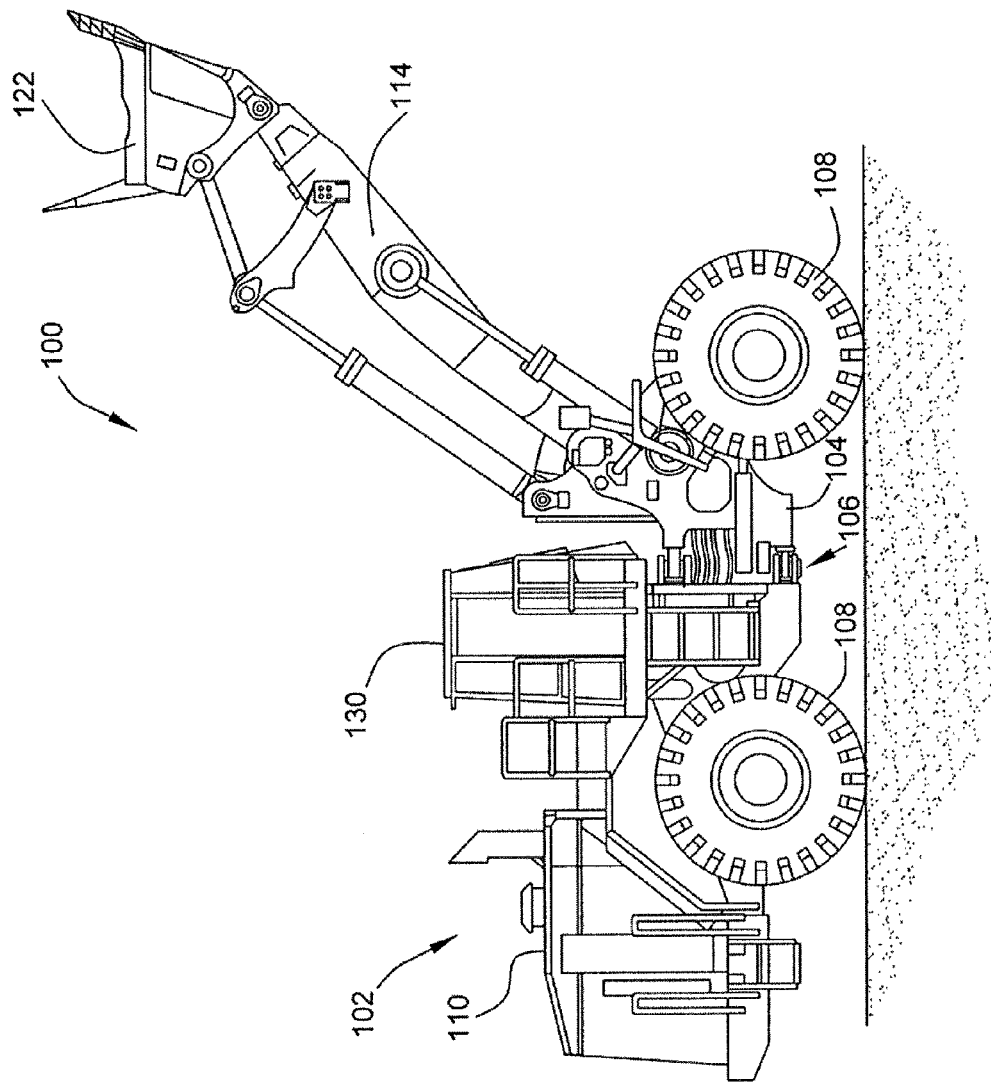
FIG. 1 is a side view of a work machine in accordance with the disclosure.

FIG. 1 illustrates a side view of a machine 100 of which one particular example is a wheel loader (depicted in the figure) such as those used for construction, mining, or quarrying. The machine 100 is a direct series electric drive machine. In the description that follows, this example illustrates the various arrangements that can be used on machines having direct series electric drive systems powered by at least two generators whose output is delivered to a single power bus. As can be appreciated, other vehicles having a direct series electric drive arrangement can benefit from the advantages described herein. The term "machine" generically refers to any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated on-board.

With continued reference to FIG. 1, the machine 100 includes an engine frame portion 102 connected to a non-engine frame portion 104 by an articulated joint 106. The machine 100 includes ground engaging members, in this case, a set of wheels 108. The engine frame portion 102 includes the engine 110. The machine 100 further includes an operator cab 130 that houses various machine control devices. The machine 100 of the illustrated embodiment includes a work implement, which in this case is a bucket 122 connected at the end of a pair of lift arms 114 that are pivotally connected to the non-engine frame portion 104 of the machine 100.

Figure 2:
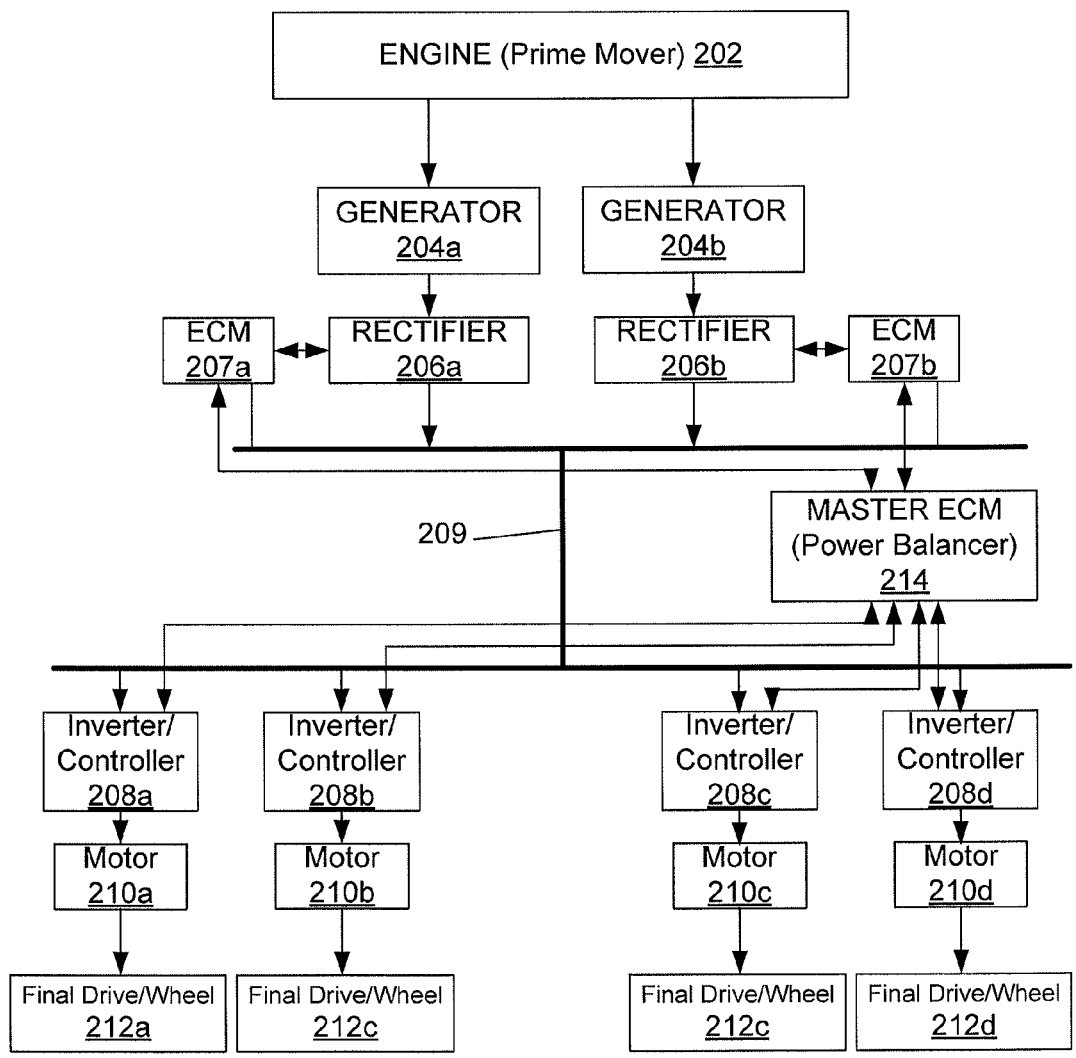
FIG. 2 is a block diagram of a dual generator electric drive system for a work machine in accordance with the disclosure.

The machine 100 (wheel loader) is a direct series electric drive machine, which in this instance refers to the use of more than one source or form of power to drive the wheels 108 of the machine 100. A block diagram for the direct series electric drive system of the machine 100 is shown in FIG. 2. In the block diagram of FIG. 2, the flow direction of power (mechanical in the case of the engine/generator and motor/final drive interfaces) in the system when the machine 100 is propelled is denoted by solid-lined arrows. It is noted that the machine 100 can operate in a "retarding" mode wherein motors associated with drive wheels of the machine operate as generators—causing a reverse flow of current from the motors. FIG. 2 also shows connections between a master ECM and a set of control components to ensure proper control of power supply and consumption by the components identified in FIG. 2.

The direct series electric drive system includes an engine 202, for example, an internal combustion engine such as a diesel engine, which produces an output torque at an output shaft (not shown). The output shaft of the engine 202 is connected to a first generator 204a and a second generator 204b. In operation, the output shaft of the engine 202 rotates a rotor of each of the first generator 204a and the second generator 204b to produce electrical power, for example, in the form of alternating current (AC) power. Even though a direct connection is shown between the engine 202 and the generators 204a and 204b, other drive components, such as a transmission or other gear arrangements, may be utilized to couple the output of the engine 202 to the generators 204a and 204b. The generators 204a and 204b may be any appropriate type of generator or alternator known in the power generation art.

The generators 204a and 204b each output three phases of alternating current, with each output having a respective current transducer connected thereto. The electrical power of the first generator 204a and the second generator 204b is supplied, respectively to a first rectifier 206a and a second rectifier 206b and converted to direct current (DC) power. In an illustrative example, the first rectifier 206a and the second rectifier 206b may comprise insulated gate bi-polar transistors (IGBTs). An IGBT is a three terminal power semiconductor device that notably combines the desirable operational traits of high efficiency and fast switching of potentially large current. Other types of rectifier circuits may be used for the first rectifier 206a and the second rectifier 206b. It is noted that IGBTs are capable of bi-directional power flow and thus may be operated to perform both A/C to D/C conversion and D/C to AC conversion functions. Thus, the same type of circuit may be used to carry out both rectifier functionality and inverter functionality as discussed herein.

The first rectifier 206a and the second rectifier 206b are directly controlled, respectively, by a first electronic control module (ECM) 207a and a second ECM 207b to produce a particular electrical output on a single DC bus 209. It is specifically noted that the output from the first rectifier 206a is provided directly to the single DC bus 209, and the output from the second rectifier 206b is provided directly to the single DC bus 209. The single DC bus 209, by way of example, comprises a high voltage rail and low voltage rail—not shown for purposes of avoiding clutter—to which each of the depicted electrical components are connected. In an illustrative example, the first rectifier 206a and the second rectifier 206b deliver a combined power on the single DC bus 209 of up to 500 kW at 650 Volts. It is noted that this is merely an exemplary figure/configuration for power output and other power output values are contemplated in alternative examples.

The rectified DC power on the single DC bus 209 is converted back to AC power by a set of inverter/controllers 208a, 208b, 208c and 208d that are directly coupled to the single DC bus 209. Any known inverter may be used for the arrangement of the inverter/controllers. In one example, the inverter circuit may include three phase arrays of insulated gate bi-polar transistors (IGBTs) arranged in transistor pairs and configured to supply a 3-phase AC output to respective drive motors. The inverter/controllers can control the speed of the motors by controlling the frequency and/or the pulse-width of their AC output to the respective motors.

The inverter/controllers 208a, 208b, 208c and 208d are depicted as a single module in FIG. 2. However, in practice such component is typically provided in the form of an inverter circuit and a separate inverter controller circuit. The inverter/controllers 208a, 208b, 208c and 208d may be capable of selectively adjusting the frequency and/or pulse-width of their respective output to motors 210a, 210b, 210c and 210d. Such adjustments enable each of the motors 210a, 210b, 210c and 210d to operate at independently variable speeds. The motors 210a, 210b, 210c and 210d may be connected via final assemblies (not shown) or directly to respective drive wheels 212a, 212b, 212c and 212d of the machine 100.

A master ECM 214 may be incorporated into the overall control framework of the electric drive system to provide supervisory control over the ECMs 207a and 207b as well as the inverter/controllers 208a, 208b, 208c and 208d. The master ECM 214 may be configured to operate as a power balancer for the first generator 204a and the second generator 204b. The master ECM acquires operational status information from the ECMs 207a and 207b to ensure the rectifiers 206a and 206b operate in unison to provide balanced power to the single DC Bus 209 (i.e., both generators operating in a generator mode—as opposed to one operating in generating mode while the other is operating in a motoring mode). By way of example, the first ECM 207a and the second ECM 207b each provide, to the master ECM 214, a signal indicative of the current voltage level, sensed independently by each of the first ECM 207a and the second ECM 207b, of the single DC Bus 209. Based upon the provided voltage level signals provided by the first ECM 207a and the second ECM 207b, the master ECM 214 may provide a corrective signal to one or both the first ECM 207a and the second ECM 207b. Alternative schemes for ensuring unified operation of the generators and rectifiers are contemplated as well.

When the machine 100 is to be decelerated or its motion retarded, for example, to prevent acceleration of the machine 100 when travelling down an incline, the machine 100's kinetic energy is converted to electrical energy. Effective disposition of the generated electrical power enables effective retarding of the machine 100. The retarding aspect of the machine 100's operation is only of secondary importance and will therefore not be discussed further. Instead, the remainder of this description focuses primarily upon the operation of the machine 100 in a propel mode, and more particularly, the operation of the generators 204a and 204b simultaneously providing power (via rectifier 206a and rectifier 206b) to the single DC bus 209 under control of the first ECM 207a and the second ECM 207b that are, in turn, controlled in a supervisory arrangement by the Master ECM 214.

Figure 3:
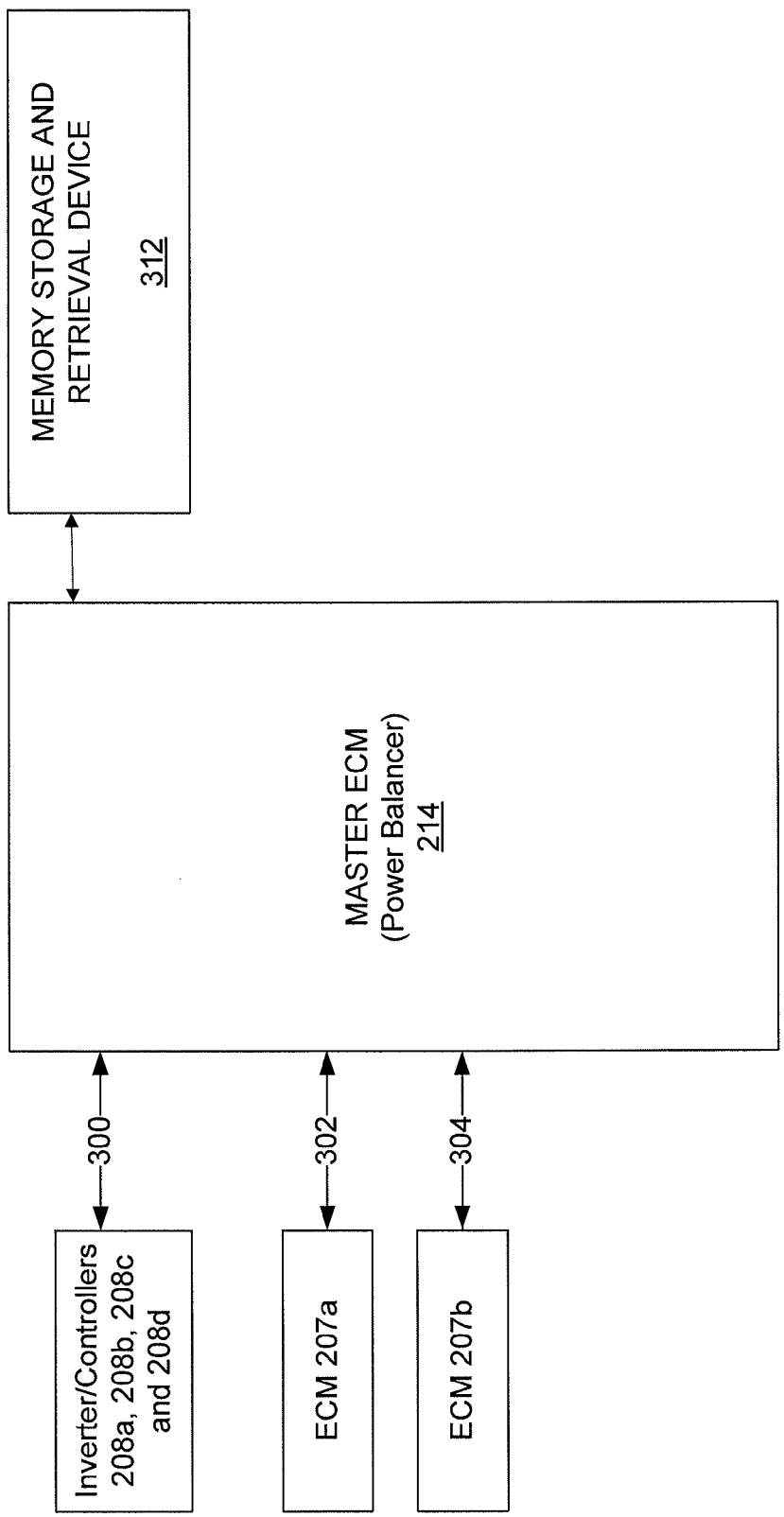
FIG. 3 is a block diagram illustrating various connections between a master controller and various control components of an electric drive system in accordance with the disclosure.

A block diagram for the master ECM 214 for use in the drive system of an electric drive machine is shown in FIG. 3. The master ECM 214 may be a single controller or may include more than one controller disposed to control various functions and/or features of a machine. For example, a master controller, used to control the overall operation and function of the machine, may be cooperatively implemented with a motor or engine controller, used to control the engine 202. In this embodiment, the term "controller" is meant to include one, two, or more controllers that may be associated with the machine 100 and that may cooperate in controlling various functions and operations of the machine 100. The functionality of the controller may be implemented in hardware and/or software without regard to the discrete functionality. Accordingly, various interfaces of the master ECM 214 are described relative to components of the drive system shown in the block diagram of FIG. 2. Such interfaces are not intended to limit the type and number of components that are connected, nor the number of controllers that are described.

Turning to FIG. 3, the master ECM 214 may operate in a logical fashion to perform operations, execute control algorithms, store and retrieve data, and so forth. In this embodiment, the master ECM 214 may access a memory storage and retrieval device 312 that contains, for example, one or more tables (or other appropriate data organization) containing addressable elements of data. The memory storage and retrieval device 312 may be in the form of read only memory (ROM) or random access memory (RAM) or integrated circuitry that is accessible by the master ECM 214, or integrated therewith.

In addition to its function of controlling various components and/or systems of the machine 100, the master ECM 214 may further be disposed to diagnose fault conditions of various components and systems. More specifically, the master ECM 214 may continuously monitor various operating parameters of the machine 100, compare them to respective expected values, and diagnose failures or fault conditions in various systems of the machine when the monitored parameters, or sets of parameters, diverge from expected values. In one embodiment, the master ECM 214 may perform diagnostic operations when the machine is first started, or idle, such that various operating parameters are repeatable and stable. For example, various diagnostic operations may be performed when the electric drive system of the machine is operating and in an idle condition. An idle condition is meant to encompass any operating mode of the machine during which generator is operating but there is no power or very little electrical power being consumed. In such a condition, fault conditions may be detected by the master ECM 214 and stored within the memory storage and retrieval device 312 for later retrieval and inspection by service personnel. These fault indications may be in the form of single bit data elements that, for example, are set at a zero value when no fault has been detected, and changed to a value of one when a fault has been detected. Other data values or variable types may also be used.

The master ECM 214 is disposed to transmit control signals and receive status signals from each of the inverter controllers 208a, 208b, 208c and 208d via lines 300. Such signals are used, for example, to regulate the speed of the corresponding motors 210a, 210b, 210c and 210d.

In FIG. 3, the master ECM 214 is further disposed to receive operational status signals via lines 302 and 304 from the first ECM 207a and the second ECM 207b. Such signals include at least a sensed voltage on the single DC bus 209 provided by each of the first ECM 207a and the second ECM 207b. The master ECM 214 is configured to provide a control signal via lines 302 and 304 to the first ECM 207a and the second ECM 207b to correct a potential error in the one or more sensed voltage values provided to the master ECM 214 to prevent a potential imbalance between the operating states of the first generator 204a and the second generator 204b. The potential imbalance prevention scheme is discussed below with reference to FIG. 4.

Figure 4:
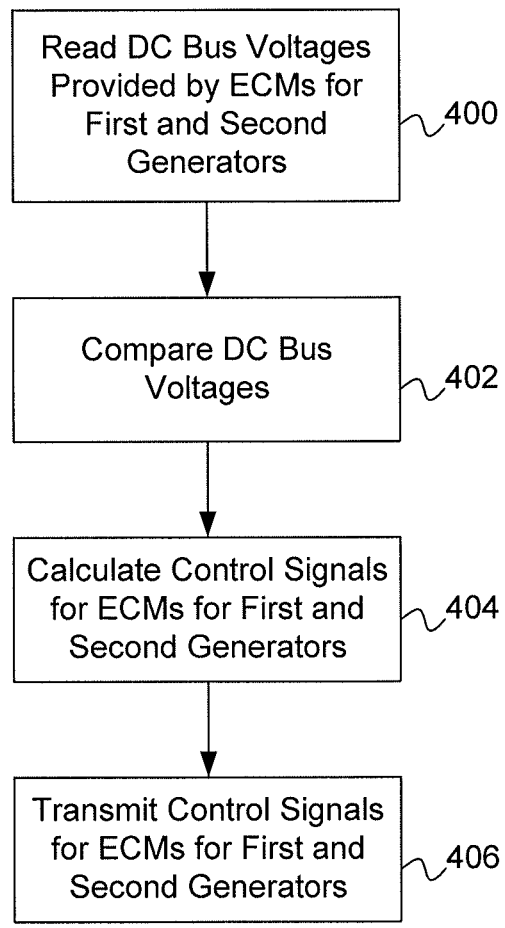
FIG. 4 is a flowchart for a method for determining the operating condition of two generators providing power to a single DC bus of the electric drive system in accordance with the disclosure.

FIG. 4 is a flowchart for a method of monitoring and maintaining balanced power output by the first generator 204a and the second generator 204b during operation of the machine 100. During step 400 the master ECM 214 reads voltage readings acquired by the first ECM 207a and the second 207b for the single DC bus 209. Thereafter, a power balancer module executes on the master ECM 214 to ensure balanced operation of both the first generator 204a and the second generator 204b. In particular, at step 402 the power balancer module compares the voltages provided by the ECM 207a and the second ECM 207b for the first generator 204a and the second generator 204b, respectively.

During step 404, based upon the comparison during step 402, the master ECM 214 calculates control signals for transmission to both the first ECM 207a and the second ECM 207b. Thereafter, during step 406 the master ECM 214 transmits voltage correction signals to the first ECM 207a and the second ECM 207b to cause a balanced operation of the first generator 204a and the second generator 204b.

INDUSTRIAL APPLICABILITY

The industrial applicability of the system described herein should be readily appreciated from the foregoing discussion. The present disclosure may be included as part of an electrical power drive system for a work machine such as an off-road machine of which a wheel loader is a particular example.

Off-highway work machines, particularly those adapted to use electric, hybrid, or direct series electric drive systems, may require large power generation capabilities that necessitate use of multiple generators. Moreover, dual-generators may be needed to provide a level of redundancy for ensuring the ability of a work machine to operate in a degraded operation mode in the event one of the generators is rendered inoperative.

The systems described above can be adapted to a large variety of machines and tasks. For example, other types of industrial machines, such as backhoe loaders, compactors, feller bunchers, forest machines, industrial loaders, skid steer loaders, wheel loaders and many other machines can benefit from the system described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An electric power supply system configured to deliver operating electrical power in a machine having an electric drive system, the electric power supply system comprising:
   a first generator and a second generator, each configured to receive an output provided by a prime mover;
   a first rectifier coupled to the first generator and having a first direct current (DC) output;
   a second rectifier coupled to the second generator and having a second DC output;
   a single DC bus to which both the first DC output and the second DC output are coupled, thereby providing an arrangement for the first rectifier and the second rectifier to simultaneously provide power to the single DC bus;
   a first inverter/controller coupled to the single DC bus and configured to provide a controlled alternating current to a first motor driving a final drive of the machine; and
   a master electronic control module (ECM) configured to monitor the first DC output and the second DC output and provide control signals for maintaining a balanced power output by the first rectifier and the second rectifier on the single DC bus, the method comprising;
   wherein the first generator and the second generator are configured to simultaneously provide, via the first rectifier and the second rectifier, power to the single DC bus for use by at least the first inverter/controller.

2. The electric power supply system of claim 1 further comprising: a first ECM configured to control the first rectifier; a second ECM configured to control the second rectifier; a communication channel between the master ECM and each of the first ECM and the second ECM facilitating receiving, by the master ECM, signals from the first ECM and the second ECM indicative of separate voltage readings by each on the single DC bus.

3. The electric power supply system of claim 2, the communication channel between the master ECM and each of the first ECM and the second ECM facilitating transmitting, by the master ECM, a voltage correction signal for adjusting the output of at least one of the first generator and the second generator on the single DC bus.

4. The electric power supply system of claim 1 wherein the electric power supply system comprises at least a second inverter/controller coupled to the single DC bus and configured to provide a controlled alternating current to a second motor driving a final drive of the machine.

5. The electric power supply system of claim 4 wherein the electric power supply system is configured to power a wheel loader machine.

6. The electric power supply system of claim 4 wherein the electric power supply system comprises:
   a third inverter/controller coupled to the single DC bus and configured to provide a controlled alternating current to a third motor driving a final drive of the machine; and
   a fourth inverter/controller coupled to the single DC bus and configured to provide a controlled alternating current to a fourth motor driving a final drive of the machine.

7. The electric power supply system of claim 6 wherein the electric power supply system is configured to power a wheel loader machine.

8. A machine having an electric drive for propelling the machine along a ground surface, the machine comprising:
   a prime mover;
   at least a first traction drive;
   an electric power supply system configured to deliver operating electrical power to the electric drive, the electric power supply system comprising:
      a first generator and a second generator, each configured to receive an output provided by the prime mover;
      a first rectifier coupled to the first generator and having a first direct current (DC) output;
      a second rectifier coupled to the second generator and having a second DC output;
      a single DC bus to which both the first DC output and the second DC output are coupled, thereby providing an arrangement for the first rectifier and the second rectifier to simultaneously provide power to the single DC bus;
      a first inverter/controller coupled to the single DC bus and configured to provide a controlled alternating current to a first motor driving the first traction drive; and
      a master electronic control module (ECM) configured to monitor the first DC output and the second DC output and provide control signals for maintaining a balanced power output by the first rectifier and the second rectifier on the single DC bus,
      wherein the first generator and the second generator are configured to simultaneously provide, via the first rectifier and the second rectifier, power to the single DC bus for use by at least the first inverter/controller.

9. The machine of claim 8 wherein the machine is a wheel loader.

10. The machine of claim 8 wherein the electric power supply system further comprising:
    a first ECM configured to control the first rectifier;
    a second ECM configured to control the second rectifier;
    a communication channel between the master ECM and each of the first ECM and the second ECM facilitating receiving, by the master ECM, signals from the first ECM and the second ECM indicative of separate voltage readings by each on the single DC bus.

11. The machine of claim 8 wherein, in electric power supply system, the communication channel between the master ECM and each of the first ECM and the second ECM facilitates transmitting, by the master ECM, a voltage correction signal for adjusting the output of at least one of the first generator and the second generator on the single DC bus.

12. The machine of claim 8 wherein the electric power supply system comprises at least a second inverter/controller coupled to the single DC bus and configured to provide a controlled alternating current to a second motor driving a final drive of the machine.

13. The machine of claim 12 wherein the electric power supply system comprises:

a third inverter/controller coupled to the single DC bus and configured to provide a controlled alternating current to a third motor driving a final drive of the machine; and a fourth inverter/controller coupled to the single DC bus and configured to provide a controlled alternating current to a fourth motor driving a final drive of the machine.

14. A method for controlling an electric power supply system configured to deliver operating electrical power in a machine having an electric drive system, the electric power supply system comprising a first generator and a second generator, each configured to receive an output provided by a prime mover, a first rectifier coupled to the first generator and having a first direct current (DC) output, a second rectifier coupled to the second generator and having a second DC output, a single DC bus to which both the first DC output and the second DC output are coupled, a first inverter/controller coupled to the single DC bus and configured to provide a controlled alternating current to a first motor driving a final drive of the machine, and a master electronic control module (ECM) configured to monitor the first DC output and the second DC output and provide control signals for maintaining a balanced power output by the first rectifier and the second rectifier on the single DC bus, the method comprising:

simultaneously providing, by the first generator and the second generator via the first rectifier and the second rectifier, power to the single DC bus for use by at least the first inverter/controller.

15. The method of claim 14 wherein the electric power supply system further comprises a master electronic control module (ECM), the method further comprising:

monitoring operation of components providing the first DC output and the second DC output, and providing control signals for maintaining a balanced power output by the first rectifier and the second rectifier on the single DC bus.

16. The method of claim 15 wherein the electric power supply system further comprises a first ECM configured to control the first rectifier, a second ECM configured to control the second rectifier, and a communication channel between the master ECM and each of the first ECM and the second ECM, the method further comprising:

receiving, by the master ECM, signals from the first ECM and the second ECM indicative of separate voltage readings obtained by each on the single DC bus; and executing a control operation, by a balancer module on the master ECM, based upon the signals from the first ECM and the second ECM, ensuring balanced operation of both the first generator and the second generator.

17. The method of claim 16 wherein the executing a control operation step comprises:

comparing values for the separate voltage readings obtained the first ECM and the second ECM on the single DC bus; and calculating, based upon the comparing values, control signals for transmission to both the first ECM and the second ECM to cause a balanced operation of the first generator and the second generator.

18. The method of claim 17 further comprising:

transmitting, by the master ECM and based upon the calculating step, voltage correction signals to the first ECM and the second ECM.

19. The method of claim 14 wherein the electric power supply system is configured to power a wheel loader machine.

* * * * *